US012476372B2

(12) United States Patent
Hamabe

(10) Patent No.: US 12,476,372 B2
(45) Date of Patent: Nov. 18, 2025

(54) ANTENNA DEVICE AND COMMUNICATION DEVICE

(71) Applicant: Panasonic Intellectual Property Management Co., Ltd., Osaka (JP)

(72) Inventor: Taichi Hamabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 223 days.

(21) Appl. No.: 18/207,859

(22) Filed: Jun. 9, 2023

(65) Prior Publication Data

US 2023/0402756 A1 Dec. 14, 2023

(30) Foreign Application Priority Data

Jun. 10, 2022 (JP) ................................ 2022-094689
Jul. 13, 2022 (JP) ................................ 2022-112541

(51) Int. Cl.
*H01Q 1/38* (2006.01)
*H01Q 1/48* (2006.01)
*H01Q 9/04* (2006.01)

(52) U.S. Cl.
CPC ............ *H01Q 9/0414* (2013.01); *H01Q 1/38* (2013.01); *H01Q 1/48* (2013.01)

(58) Field of Classification Search
CPC .......... H01Q 1/2291; H01Q 1/24; H01Q 1/38; H01Q 1/48; H01Q 9/0414; H01Q 15/006; H01Q 19/108
See application file for complete search history.

(56) References Cited

U.S. PATENT DOCUMENTS 10,461,428 B2 * 10/2019 Jeong ..................... H01Q 5/385
11,621,489 B2 * 4/2023 Hamabe ................. H01Q 13/28 343/702

(Continued)

FOREIGN PATENT DOCUMENTS

WO 2018/198981 11/2018

OTHER PUBLICATIONS

M. Li, S.-Q. Xiao, Z. Wang and B.-Z. Wang, "Compact Surface-Wave Assisted Beam-Steerable Antenna Based on HIS," in IEEE Transactions on Antennas and Propagation, vol. 62, No. 7, pp. 3511-3519, Jul. 2014, doi: 10.1109/TAP.2014.2321161. (Year: 2014).*

(Continued)

*Primary Examiner* — Sean Kayes
(74) *Attorney, Agent, or Firm* — Wenderoth, Lind & Ponack, L.L.P.

(57) ABSTRACT

There are provided an antenna device and a communication device including: a board including a metamaterial layer, a ground layer, and a first layer disposed on a side opposite to the ground layer across the metamaterial layer; a first resonator to which power is fed, the first resonator being provided in the first layer; and a second resonator including two conductors provided along a longitudinal direction of the first resonator, the conductors being provided on the first layer and on both sides of the first resonator in a short direction of the first resonator. The two conductors of the second resonator have end portions, and one terminal of each of the end portions is connected to the ground layer.

9 Claims, 13 Drawing Sheets

(56) References Cited

U.S. PATENT DOCUMENTS

| | | | | |
|---|---|---|---|---|
| 2009/0040112 | A1* | 2/2009 | Sekine | H01Q 15/008 343/700 MS |
| 2018/0205145 | A1* | 7/2018 | Hamabe | H01Q 1/48 |
| 2019/0267713 | A1* | 8/2019 | Jeong | H01Q 9/065 |
| 2020/0059009 | A1 | 2/2020 | Sonoda | |
| 2020/0295449 | A1* | 9/2020 | Hamabe | H01Q 1/48 |
| 2021/0336340 | A1* | 10/2021 | Hamabe | H01Q 5/378 |

OTHER PUBLICATIONS

Extended European Search Report issued Nov. 3, 2023 in corresponding European Patent Application No. 23159550.5.

Mei Li et al., "Compact Surface-Wave Assisted Beam-Steerable Antenna Based on HIS", IEEE Transactions on Antennas and Propagation, IEEE, USA, vol. 62, No. 7, Jul. 1, 2014 (Jul. 1, 2014), pp. 3511-3519.

Herwansyah Lago et al., "AMC-Integrated Reconfigurable Beamforming Folded Dipole Antenna with Parasitic and RF MEMS", Progress In Electromagnetics Research C, vol. 69 , Nov. 1, 2016 (Nov. 1, 2016), pp. 159-167.

Nowrin H. Chamok et al., "A Thin Switched Beam Parasitic Antenna Array on Planar EBG for 2.4 GHz Wireless Application", 2016 IEEE International Symposium on Antennas and Propagation (APSURSI), IEEE, Jun. 26, 2016 (Jun. 26, 2016), pp. 1909-1910.

* cited by examiner

ANTENNA DEVICE AND COMMUNICATION DEVICE

CROSS-REFERENCE TO RELATED APPLICATIONS

This application is based on and claims priority under 35 USC 119 from Japanese Patent Application No. 2022-094689 filed on Jun. 10, 2022, and Japanese Patent Application No. 2022-112541 filed on Jul. 13, 2022, the contents of which are incorporated herein by reference.

TECHNICAL FIELD

The present disclosure relates to an antenna device and a communication device.

BACKGROUND ART

In the related art, there is an environment in which a plurality of communication devices each including an antenna device are provided in a predetermined space and used. For example, the predetermined space corresponds to a space in an aircraft, and examples of the communication device include a display device provided for each seat in the aircraft. Under such an environment, it is required to prevent mutual interference among communications of the communication devices and to implement transmission and reception of signals with appropriate directivity. For example, WO2018/198981A1 discloses a configuration of an antenna in which directivity is obtained in a predetermined direction.

SUMMARY OF INVENTION

The present disclosure provides an antenna device having predetermined directivity.

According to an illustrative aspect of the present disclosure, an antenna device includes: a board including a metamaterial layer, a ground layer, and a first layer disposed on a side opposite to the ground layer across the metamaterial layer; a first resonator to which power is fed, the first resonator being provided in the first layer; and a second resonator including two conductors provided along a longitudinal direction of the first resonator, the conductors being provided on the first layer and on both sides of the first resonator in a short direction of the first resonator. The two conductors of the second resonator have end portions, and one terminal of each of the end portions is connected to the ground layer.

According to another illustrative aspect of the present disclosure, a communication device includes the antenna device according to the above aspect. The first layer is located on a front surface side of the communication device, and the ground layer is located on a back surface side of the communication device.

Any combination of the above components or a conversion on the expression of the present disclosure between devices, systems, or the like is also effective as an aspect of the present disclosure.

According to the present disclosure, it is possible to provide an antenna device having predetermined directivity in which a gain in a back surface direction is prevented.

DESCRIPTION OF EMBODIMENTS

Background of Present Disclosure

In the related art, there is an environment in which a plurality of communication devices each including an antenna device are provided in a narrow space. Under such an environment, it is desired to use an antenna device having predetermined directivity such that communications between the communication devices do not interfere with each other. In addition, in recent years, it is necessary to consider restrictions that affect the communications between the antenna devices, such as miniaturization of the communication device and restrictions on an installation position and a mounting structure of the antenna device. In particular, under an environment in which a plurality of communication devices are provided in a narrow space in an arrangement having certain regularity, it is required to reduce a gain in a predetermined direction, for example, to a back surface side of the communication device to prevent interference of communication. For example, in WO2018/198981A1, the use of the antenna device under the above environment has not been sufficiently examined.

Hereinafter, embodiments specifically disclosing an antenna device and a communication device according to the present disclosure will be described in detail with reference to the accompanying drawings as appropriate. An unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The accompanying drawings and the following description are provided for those skilled in the art to fully understand the present disclosure, and are not intended to limit the subject matter described in the claims.

First Embodiment

In a first embodiment described below, an antenna device capable of performing wireless communication conforming to a wireless local area network (LAN) standard such as Bluetooth (registered trademark) or Wi-Fi (registered trademark) using a frequency in a 2.4 GHz band (for example, 2400 MHz to 2500 MHz) as an operating frequency will be described as an example. The antenna device is not limited to the above standard, and may be applied to wireless communication in a frequency band conforming to another standard.

[Device Configuration]

Figure 1:
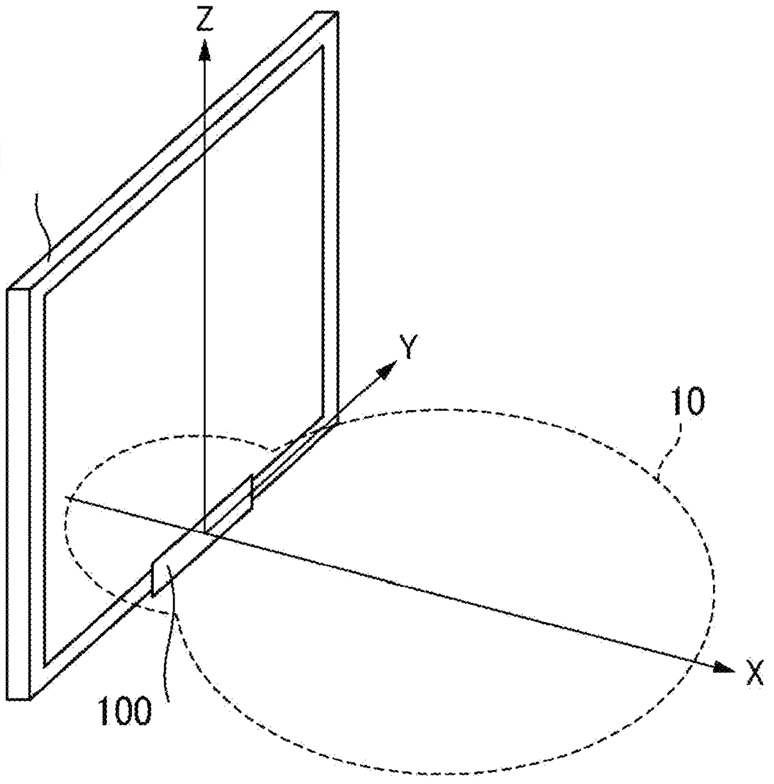
FIG. 1 is an external perspective view of a communication device including an antenna device according to a first embodiment.

FIG. 1 is an external perspective view showing an external appearance of a communication device 1 on which an antenna device 100 according to the present embodiment is mounted. In the following description, it is assumed that X, Y, and Z axes shown in the respective drawings correspond to one another. The X axis corresponds to a thickness direction of the communication device 1, that is, a front-rear direction. The Y axis corresponds to a width direction of the communication device 1, that is, a longitudinal direction of the antenna device 100. The Z axis corresponds to a height direction of the communication device 1, that is, a short direction of the antenna device 100.

The communication device 1 is, for example, a seat monitor attached to a back surface of a passenger seat in an aircraft in which wireless communication of Bluetooth (registered trademark) can be used. The communication device 1 in which the antenna device 100 according to the present embodiment is arranged is not limited to the seat monitor. In the communication device 1, for example, a display unit (for example, touch panel) using a panel such as glass is provided on a front surface side. The communication device 1 is used by a passenger who is a user being seated on a passenger seat facing the display unit. For example, the communication device 1 displays data such as an image on the display unit or receives an operation by the user via the display unit. In addition, the communication device 1 can perform, via the antenna device 100, wireless communication by Bluetooth (registered trademark) with a communication device (not shown) such as a smartphone or a tablet terminal held by the user.

In the antenna device 100, a printed wiring board on which each part is mounted is surrounded by a protective cover (not shown), and the antenna device 100 is fixedly arranged at a predetermined position of a housing of the communication device 1. In the example in FIG. 1, the antenna device 100 is arranged in the vicinity of a lower central portion of a frame around the display unit of the communication device 1. The antenna device 100 radiates a polarized wave (electromagnetic wave) in a 2.4 GHz band of Bluetooth (registered trademark) from a front surface (for example, touch panel side) of the communication device 1 toward a front direction of the passenger seat on a rear side of the aircraft, that is, a direction of the user who uses the communication device 1. A broken line 10 conceptually indicates a range of the gain of the antenna device 100. A detailed configuration example and the gain of the antenna device 100 will be described later.

Figure 2:
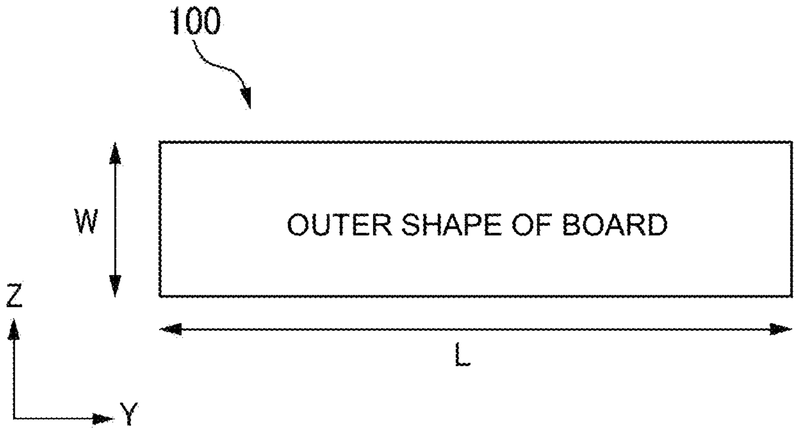
FIG. 2 is a schematic diagram showing an outer shape of a board of the antenna device according to the first embodiment.

FIG. 2 is a schematic diagram showing an outer shape of the board of the antenna device 100 according to the present embodiment. The board of the antenna device 100 according to the present embodiment has a rectangular shape. A length of the board in the longitudinal direction (Y-axis direction) is indicated by L, and a length of the board in the short direction (Z-axis direction) is indicated by W. The shape and size of the board are not particularly limited, but when it is assumed that the gain at a rear surface of the board to be described later is reduced, for example, W is required to be 30 mm or more in a 2 GHz band.

When the antenna device 100 is installed in the communication device 1, a metal structure such as a metal frame of the communication device 1 is located around the antenna device 100. Furthermore, the communication device 1 is installed in a passenger seat, and a metal piece for installation is located around the antenna device 100. That is, as being installed in the communication device 1, the antenna device 100 is surrounded by the metal structure and is easily affected by the surrounding metal, and there is a concern that the performance (for example, gain or frequency characteristics of a voltage standing wave ratio (VSWR)) as an antenna may be deteriorated.

In the present embodiment, a configuration example will be described in which desired directivity is implemented by reducing a gain to the rear of the communication device 1 while preventing deterioration in performance as an antenna device.

Figure 3:
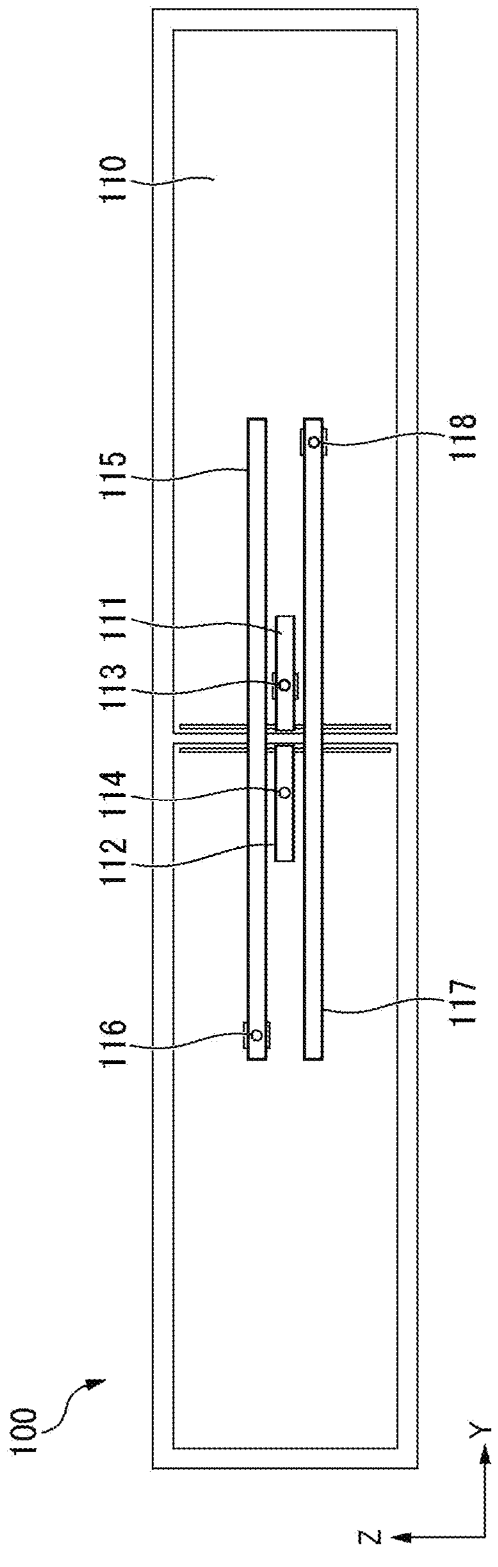
FIG. 3 is an external diagram of the antenna device according to the first embodiment as viewed from a front surface side.

FIG. 3 is an external view of the antenna device 100 according to the present embodiment as viewed along the X axis from the front surface side of the communication device 1. The antenna device 100 is configured by a laminated board having a layer structure including a plurality of layers. FIG. 3 shows a state in which a part of the configuration penetrates.

In the antenna device 100 according to the present embodiment, a dipole antenna will be described as an example. The dipole antenna is formed on the printed wiring board which is a laminated board including a plurality of layers, and a pattern of the dipole antenna is formed by etching a metal foil on a surface of the dipole antenna. Each of the plurality of layers is made of, for example, copper foil or glass epoxy. The antenna device 100 according to the present embodiment includes at least an antenna layer 110 as an example of a first layer, an artificial magnetic conductor (AMC) layer 120, and a ground layer 130.

The antenna layer 110 includes an antenna conductor 111, which is a strip conductor as an example of a feed antenna, and an antenna conductor 112, which is a strip conductor as an example of a parasitic antenna. The antenna conductor 111 is connected to a via conductor 113 for power feeding. The antenna conductor 112 is connected to a via conductor 114 for connecting with the ground (GND). The antenna conductors 111 and 112 function as first resonators. In the present embodiment, each of the antenna conductors 111 and 112 has a length of $\lambda/4$ in the longitudinal direction. Here, $\lambda$ indicates a frequency.

Furthermore, antenna conductors 115 and 117, which are strip conductors as an example of a parasitic antenna, are provided so as to sandwich the antenna conductors 111 and 112 on both sides in the Z-axis direction. The antenna conductor 115 is connected to a via conductor 116 for connecting (short-circuiting) with the ground. The antenna conductor 117 is connected to a via conductor 118 for connecting (short-circuiting) with the ground. The via conductor 116 and the via conductor 118 are connected to end portions of the antenna conductors 115 and 117, respectively, and are arranged on opposite sides in the Y-axis direction. The antenna conductors 115 and 117 function as second resonators. In the present embodiment, each of the antenna conductors 115 and 117 has a length of λ/2 in the longitudinal direction.

The AMC layer 120 is a metamaterial layer formed of a metamaterial having perfect magnetic conductor (PMC) characteristics, and is formed by a predetermined metal pattern. The ground layer 130 is formed using, for example, a conductive copper foil.

Figure 4:
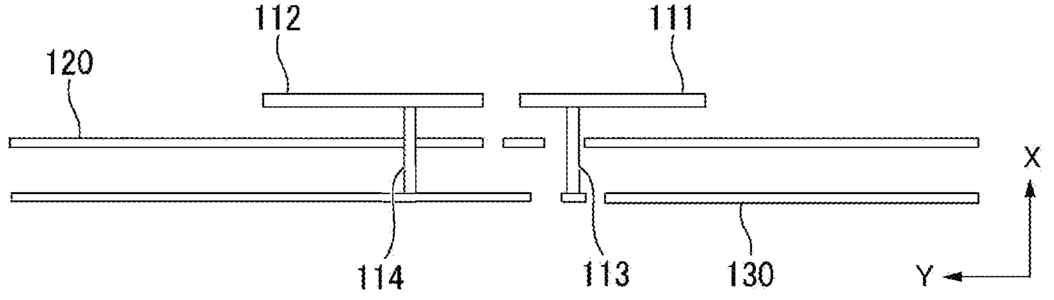
FIG. 4 is a diagram showing an example of a cross section of the board of the antenna device according to the first embodiment.

The layer structure of the antenna device 100 will be described with reference to FIGS. 4 to 7. FIG. 4 shows a cross-sectional shape when viewed along the Z axis at a position of the first resonator (antenna conductors 111 and 112) of the antenna device 100 shown in FIG. 3. The antenna conductor 111 functions as a feed antenna, and thus is connected to a feed terminal (not shown) via the via conductor 113 provided along the X-axis direction. At this time, a through hole through which the via conductor 113 penetrates is provided in the AMC layer 120. The antenna conductor 112 functions as a parasitic antenna, and thus is connected to the GND layer 130 via the via conductor 114 provided along the X-axis direction. Therefore, the antenna conductor 111, which is a feed antenna, is connected to the feed terminal, and is not connected to the AMC (AMC layer 120) and the GND (GND layer 130). On the other hand, the antenna conductor 112, which is a parasitic antenna, is connected to the AMC (AMC layer 120) and the GND (GND layer 130), and is not connected to the feed terminal.

The via conductor 113 is formed using, for example, a conductive copper foil, and constitutes a feed line between a feed point of the antenna conductor 111 and a wireless communication circuit (not shown). The wireless communication circuit is, for example, a circuit that is provided inside the communication device 1 and processes various signals for communication. The via conductor 114 is formed using, for example, a conductive copper foil, and constitutes a ground line between a feed point of the antenna conductor 112 and the wireless communication circuit (not shown).

Each of the antenna conductors 111 and 112 has, for example, a rectangular shape or a substantially rectangular shape so as to constitute a dipole antenna, and the longitudinal direction thereof extends along the Y-axis direction on a straight line. In addition, in order to minimize cancellation of the electromagnetic waves radiated from the antenna conductors 111 and 112, end portions of the antenna conductors 111 and 112 on the opposite feed point sides are arranged so as to be separated from each other by a predetermined distance.

Figure 5:
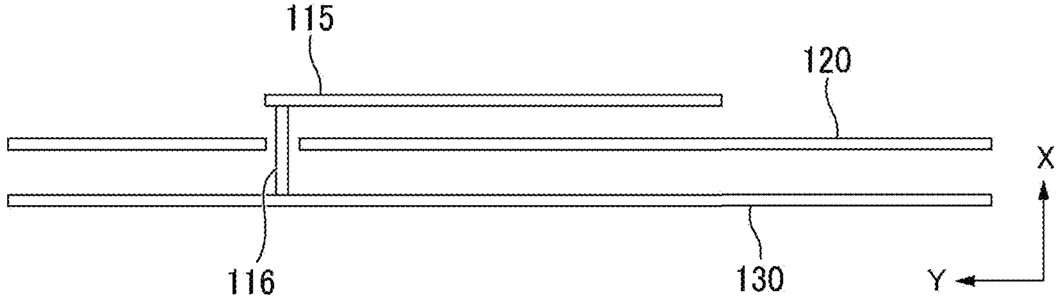
FIG. 5 is a diagram showing an example of a cross section of the board of the antenna device according to the first embodiment.

FIG. 5 shows a cross-sectional shape when viewed along the Z axis at a position of the second resonator (antenna conductor 115) of the antenna device 100 shown in FIG. 3. The antenna conductor 115 functions as a parasitic antenna, and thus is connected to the GND layer 130 via the via conductor 116 provided along the X-axis direction. Therefore, the antenna conductor 115, which is a parasitic antenna, is connected to the GND (GND layer 130), and is not connected to the feed terminal and the AMC (AMC layer 120).

Figure 6:
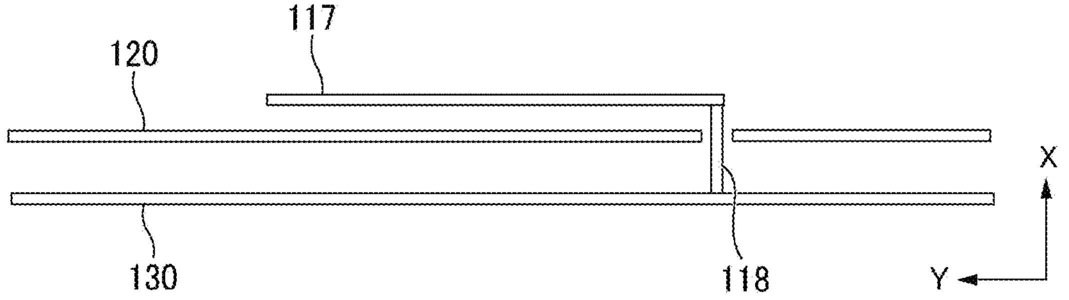
FIG. 6 is a diagram showing an example of a cross section of the board of the antenna device according to the first embodiment.

FIG. 6 shows a cross-sectional shape when viewed along the Z axis at a position of the second resonator (antenna conductor 117) of the antenna device 100 shown in FIG. 3. The antenna conductor 117 functions as a parasitic antenna, and thus is connected to the GND layer 130 via the via conductor 118 provided along the X-axis direction. Therefore, the antenna conductor 117, which is a parasitic antenna, is connected to the GND (GND layer 130), and is not connected to the feed terminal and the AMC (AMC layer 120).

Figure 7B:
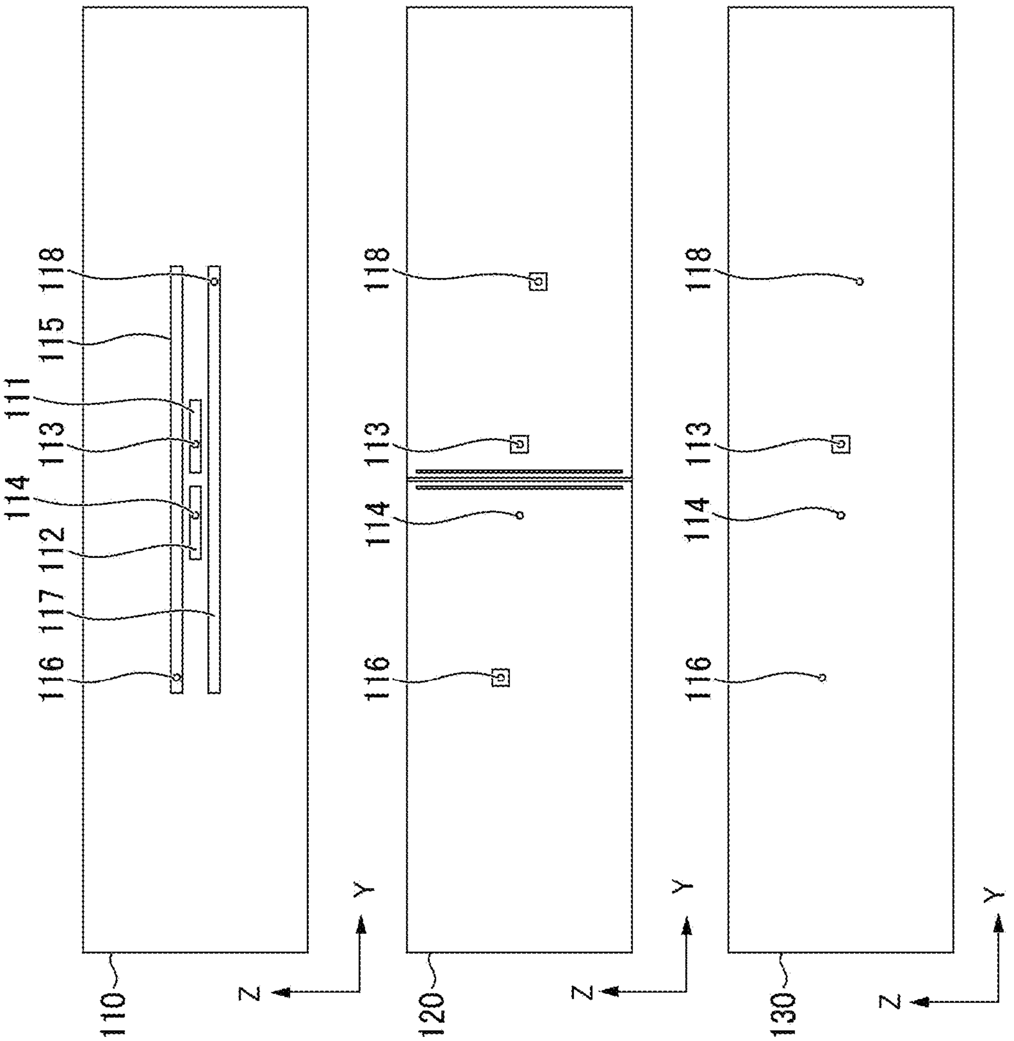
FIGS. 7A and 7B are diagrams showing an example of a layer structure of the antenna device according to the first embodiment.
Figure 7A:
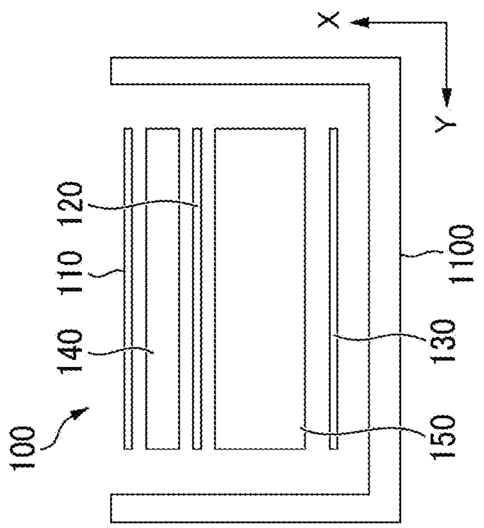

FIGS. 7A and 7B are diagrams showing the layer structure of the antenna device 100 and a configuration example of each layer. This layer structure is shown focusing on only the portion according to the present embodiment, and may include further layers. As shown in FIG. 7A, the antenna device 100 includes the antenna layer 110, a dielectric board 140, the AMC layer 120, a dielectric board 150, and the ground layer 130 in this order from the front surface side in the X-axis direction. Furthermore, the antenna device 100 is installed so as to be surrounded by a U-shaped frame 1100. In other words, only the front surface side of the communication device 1 is not surrounded by the frame 1100.

FIG. 7B shows a schematic configuration of each of the antenna layer 110, the AMC layer 120, and the ground layer 130 as viewed from the front surface side of the antenna device 100 along the X axis.

Figure 8:
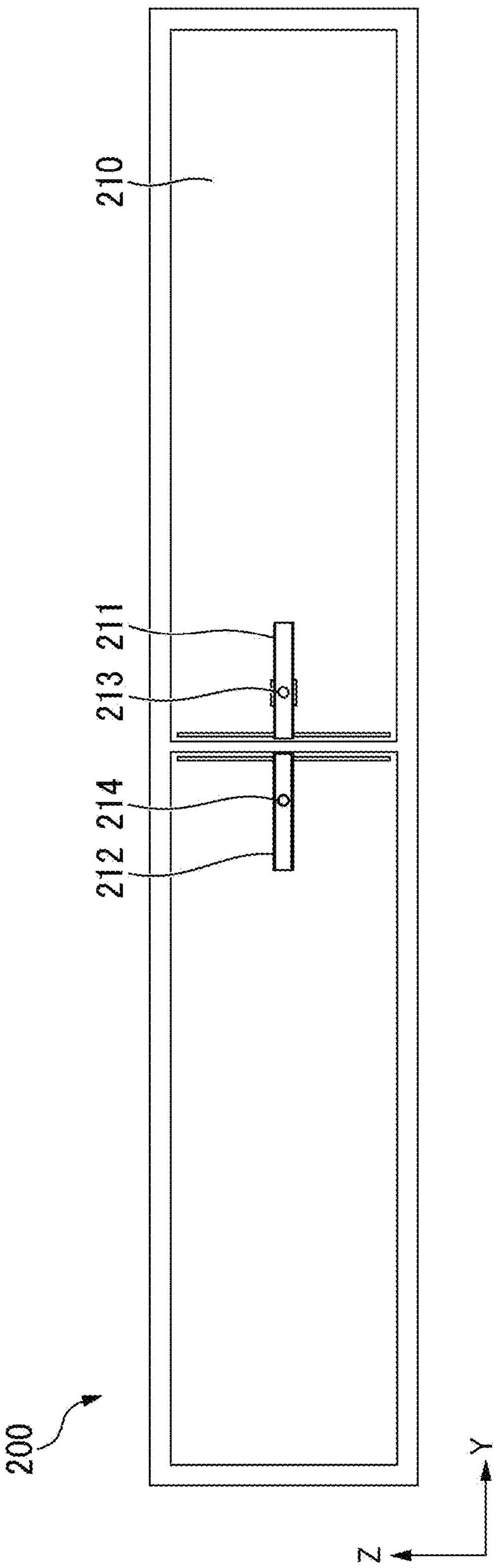
FIG. 8 is an external diagram of an antenna device in the related art as a comparative object as viewed from a front surface side.

FIG. 8 shows a configuration example of an antenna device 200 in the related art for comparison with the antenna device 100 according to the present embodiment. The antenna device 200 shown in FIG. 8 is different from the antenna device 100 according to the present embodiment shown in FIG. 3 in that the antenna device 200 does not include the second resonator (antenna conductors 115 and 117). Therefore, antenna conductors 211 and 212 and via conductors 213 and 214 of the antenna device 200 in the configuration in the related art are respectively equivalent to the antenna conductors 111 and 112 and the via conductors 113 and 114 of the antenna device 100 according to the present embodiment.

Figure 9:
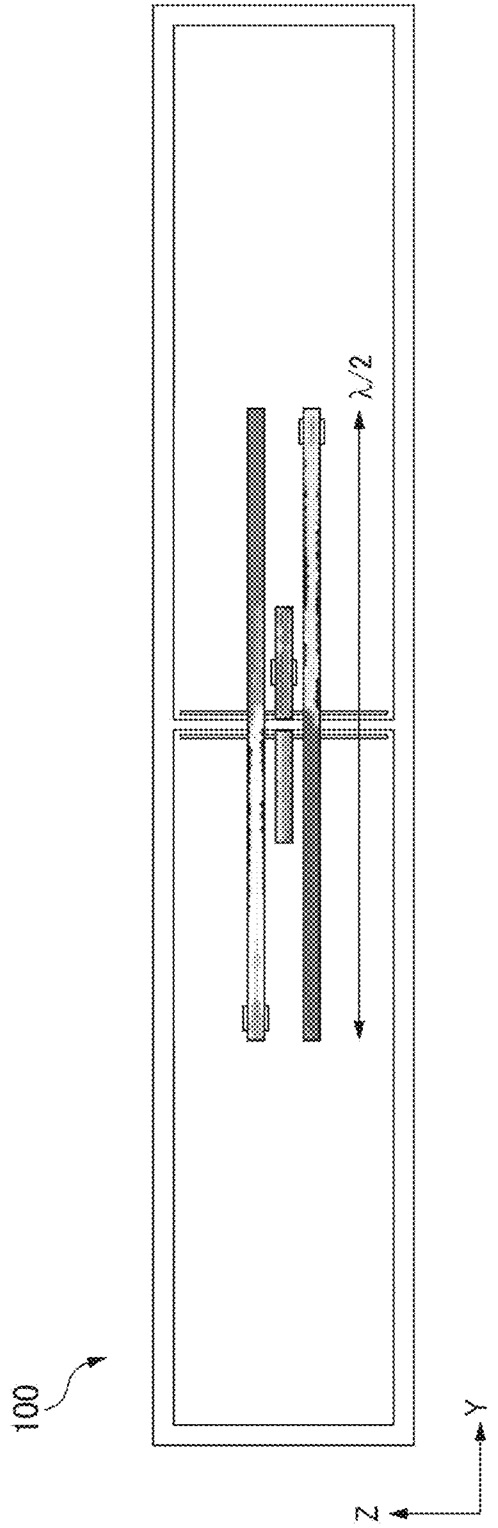
FIG. 9 is a diagram for describing an electric field distribution of the antenna device according to the first embodiment.

FIG. 9 shows an example of an electric field distribution of the antenna device 100 according to the present embodiment. Here, different colors are shown according to the intensity of an electric field. As shown in FIG. 9, the electric field is generated in the second resonator (antenna conductors 115 and 117) having a length of λ/2.

[Gain]

Figure 10:
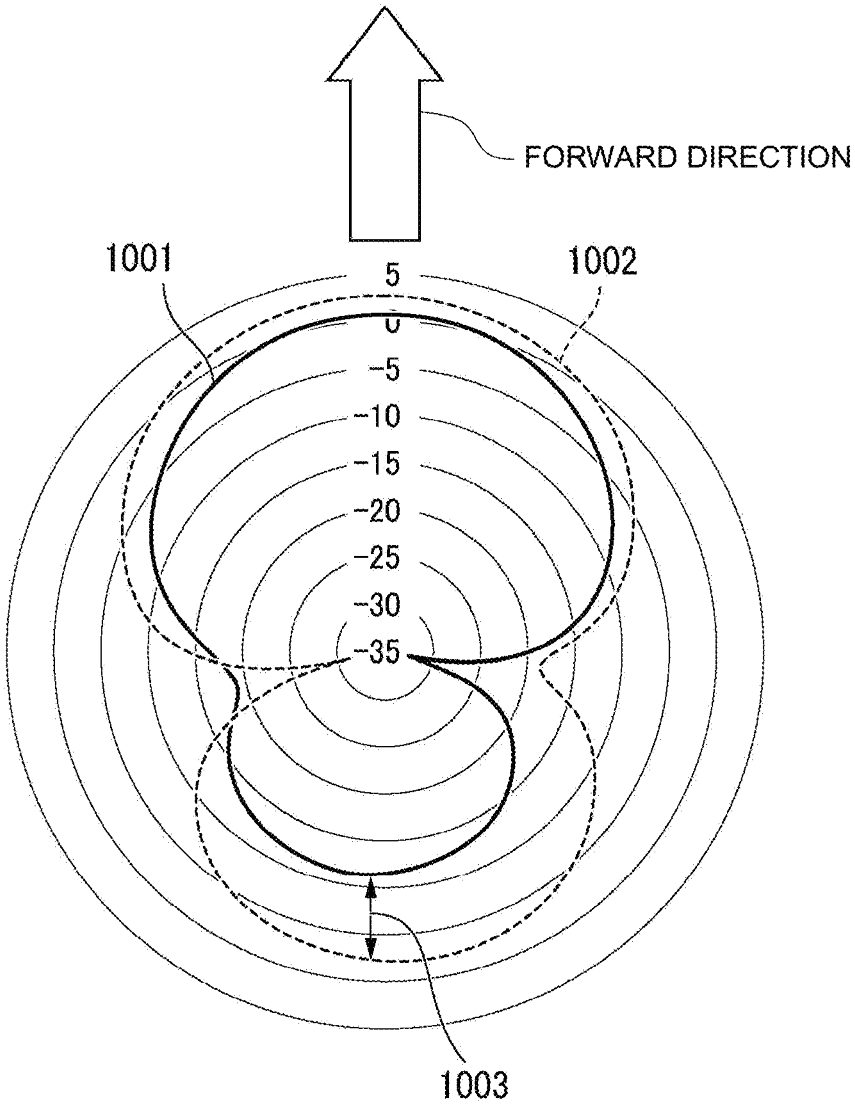
FIG. 10 is a diagram for describing a gain of the antenna device according to the first embodiment.

FIG. 10 is a diagram showing a comparison result of gains between the antenna device 100 according to the present embodiment and the antenna device 200 according to the configuration in the related art. A range 1001 indicates the gain of the antenna device 100 according to the present embodiment, and a range 1002 indicates the gain of the antenna device 200 according to the configuration in the related art. When comparing the gains, as indicated by a difference 1003, in the antenna device 100, the gain on a rear side (that is, back surface side of the communication device 1) can be reduced as compared to the gain of the antenna device 200 in the related art. That is, the resonance of the ground layer 130 arranged below the AMC layer 120 is reduced by the newly installed two second resonators.

Figure 11:
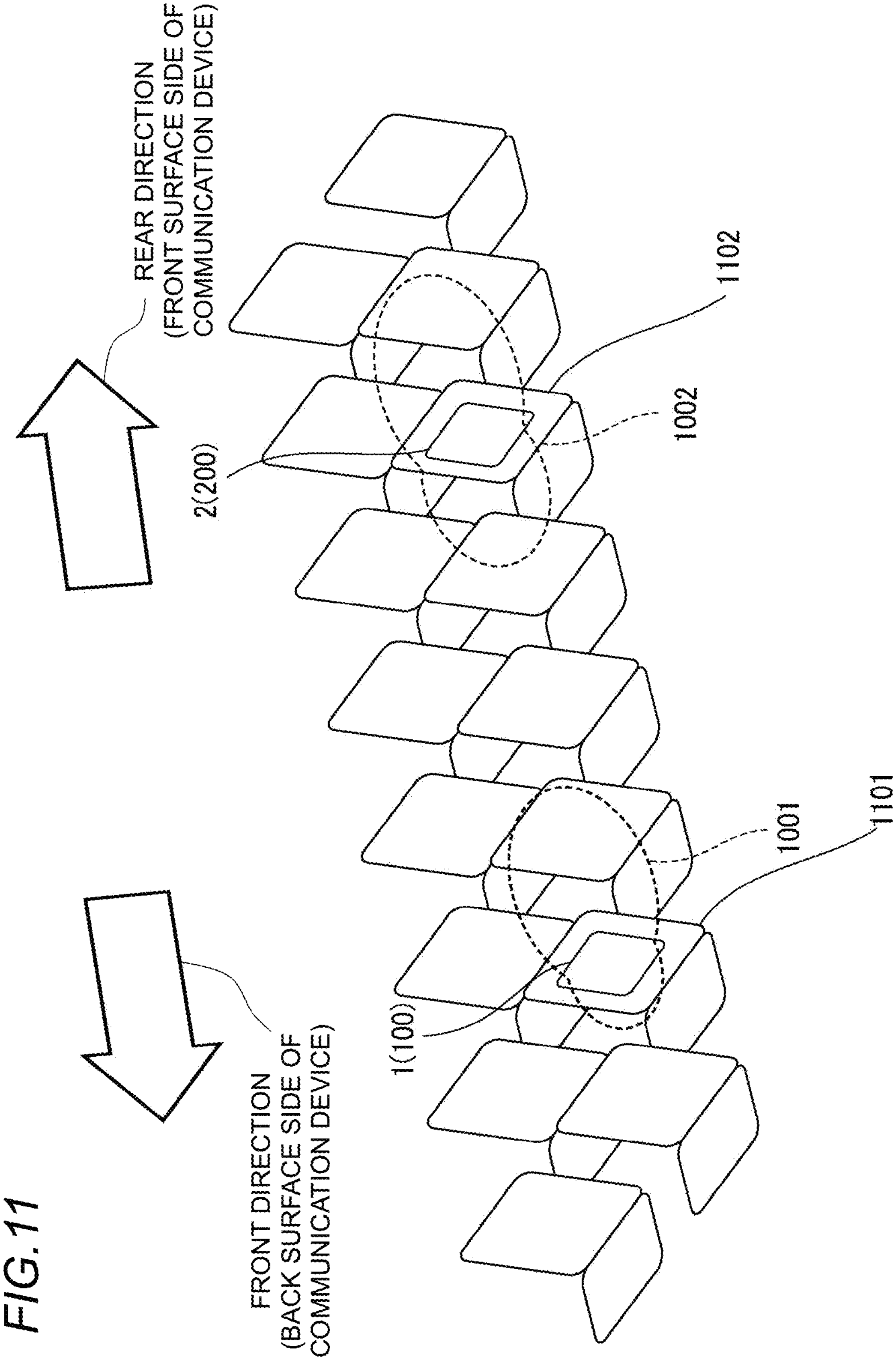
FIG. 11 is a diagram for describing an installation example of the communication device according to the first embodiment.

FIG. 11 is a conceptual diagram for describing a gain in a case where the antenna device 100 according to the present embodiment and the antenna device 200 according to the configuration in the related art are installed in an aircraft. The range 1001 corresponds to the gain of the antenna device 100 shown in FIG. 10, and the range 1002 corresponds to the gain of the antenna device 200 shown in FIG. 10. Under such an environment, signal interference can be prevented by reducing the gain on the back surface side of the communication device 1. On the other hand, by preventing the gain on the front surface side of the communication device 1 from being reduced as much as possible, for example, it is possible to prevent interference with communication with a device possessed by the user.

As described above, according to the present embodiment, the antenna device 100 includes a board including a plurality of layers including at least the AMC layer 120, the ground layer 130, and the antenna layer 110 on a side opposite to the ground layer 130 to sandwich the AMC layer 120, a first resonator (antenna conductors 111 and 112) that is provided in the antenna layer 110 and is fed, and a second resonator (antenna conductors 115 and 117) including two conductors provided along a longitudinal direction of the first resonator on both sides in a short direction of the first resonator in the antenna layer 110. One end portion of each of the two conductors of the second resonator is connected to the ground layer 130.

Accordingly, it is possible to provide an antenna device having predetermined directivity in which the gain in the back surface direction is prevented. In particular, it is possible to reduce the resonance of the ground layer arranged below the AMC layer and reduce the gain on the back surface side of the antenna device 100.

In addition, the end portions of the two conductors (antenna conductors 115 and 117) on a side connected to the ground layer 130 are located on opposite sides in the longitudinal direction (for example, Y-axis direction).

Accordingly, when an antenna device having predetermined directivity in which the gain in the back surface direction is prevented is configured, it is possible to design connections between the two respective antenna conductors and the ground layer so as to be opposite to each other in the longitudinal direction of the board.

In addition, the first resonator of the antenna device 100 includes two conductors (antenna conductors 111 and 112), and one (antenna conductor 111) of the two conductors of the first resonator is fed, and the other (the antenna conductor 112) is connected to the ground layer 130.

Accordingly, it is possible to provide an antenna device having predetermined directivity using a dipole antenna.

In addition, the length of the second resonator of the antenna device 100 in the longitudinal direction is half the length of the frequency λ to be focused of an output radio wave of the antenna device 100.

Accordingly, it is possible to provide an antenna device supporting the frequency λ to be focused and having predetermined directivity.

Second Embodiment

A second embodiment of the present invention will be described. The description of the same parts as those of the first embodiment will be omitted, and the description will be made focusing on the differences.

Figure 12:
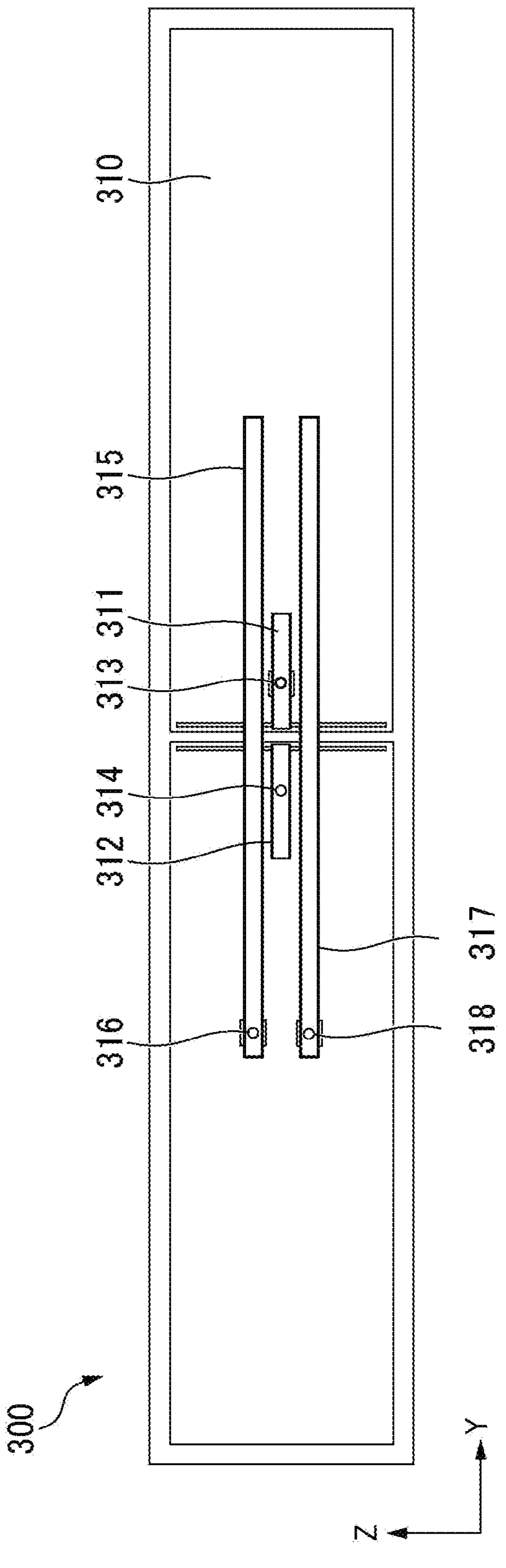
FIG. 12 is an external diagram of an antenna device according to a second embodiment as viewed from a front surface side.

FIG. 12 is an external view of an antenna device 300 according to the present embodiment as viewed from the front surface side of the communication device 1 along the X axis. The difference from the antenna device 100 according to the first embodiment shown in FIG. 3 is a position of a via conductor 318. In the antenna device 300, a via conductor 316 and the via conductor 318 are arranged at the same position in the Y-axis direction. That is, a connection configuration between two antenna conductors 315 and 317 and a GND layer 330 is different from the configuration of the first embodiment. In such a configuration, the antenna conductors 315 and 317 function as second resonators. The configuration other than the above is the same as that of the antenna device 100 according to the first embodiment.

Figure 13A:
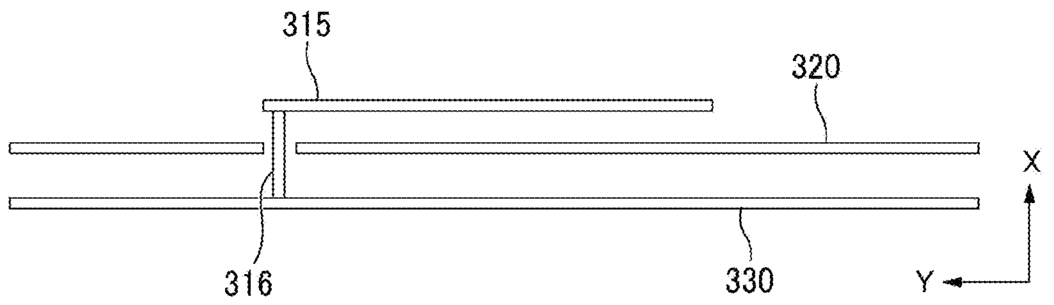
FIGS. 13A and 13B are diagrams showing an example of a cross section of a board of the antenna device according to the second embodiment.
Figure 13B:
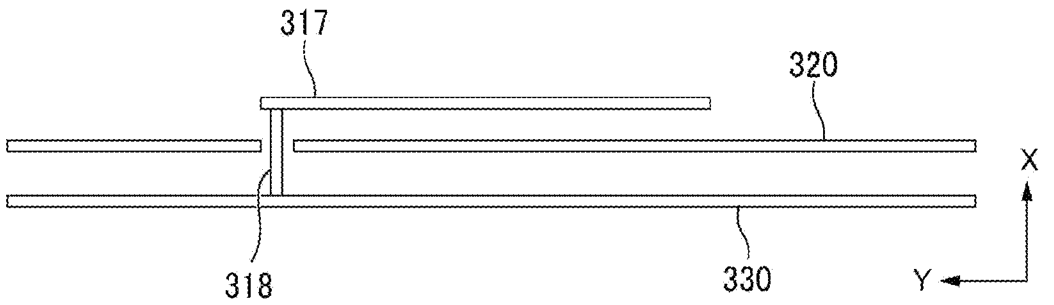

FIGS. 13A and 13B are diagrams for describing a layer structure of the antenna device 300 according to the present embodiment. FIG. 13A shows a cross-sectional shape when viewed along the Z axis at the position of the antenna conductor 315 which is one of the second resonators of the antenna device 300 shown in FIG. 12. The antenna conductor 315 functions as a parasitic antenna, and thus is connected to the GND layer 330 via the via conductor 316 provided along the X-axis direction. Therefore, the antenna conductor 315, which is a parasitic antenna, is connected to the GND (GND layer 330), and is not connected to the feed terminal and the AMC (AMC layer 320).

FIG. 13B shows a cross-sectional shape when viewed along the Z axis at the position of the antenna conductor 317 which is one of the second resonators of the antenna device 300 shown in FIG. 12. The antenna conductor 317 functions as a parasitic antenna, and thus is connected to the GND layer 330 via the via conductor 318 provided along the X-axis direction. Therefore, the antenna conductor 317, which is a parasitic antenna, is connected to the GND (GND layer 330), and is not connected to the feed terminal and the AMC (AMC layer 320).

Figure 14:
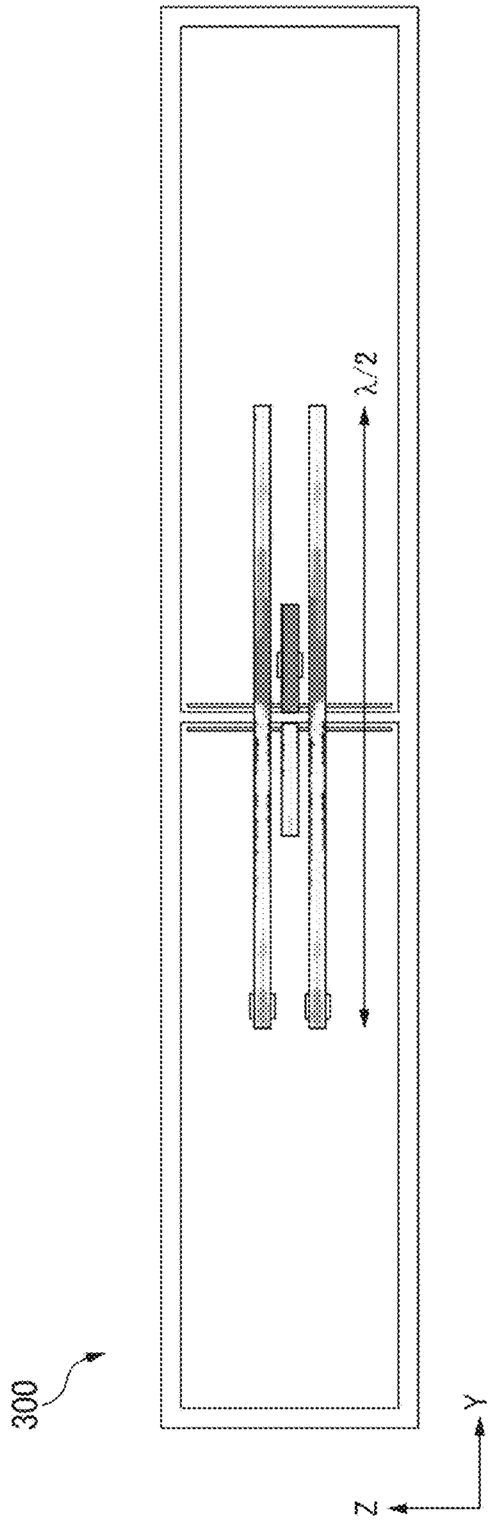
FIG. 14 is a diagram for describing an electric field distribution of the antenna device according to the second embodiment.

FIG. 14 shows an example of an electric field distribution of the antenna device 300 according to the present embodiment. Here, different colors are shown according to the intensity of an electric field. As shown in FIG. 14, the electric field is generated in the second resonator (antenna conductors 315 and 317) having a length of λ/2.

[Gain]

Figure 15:
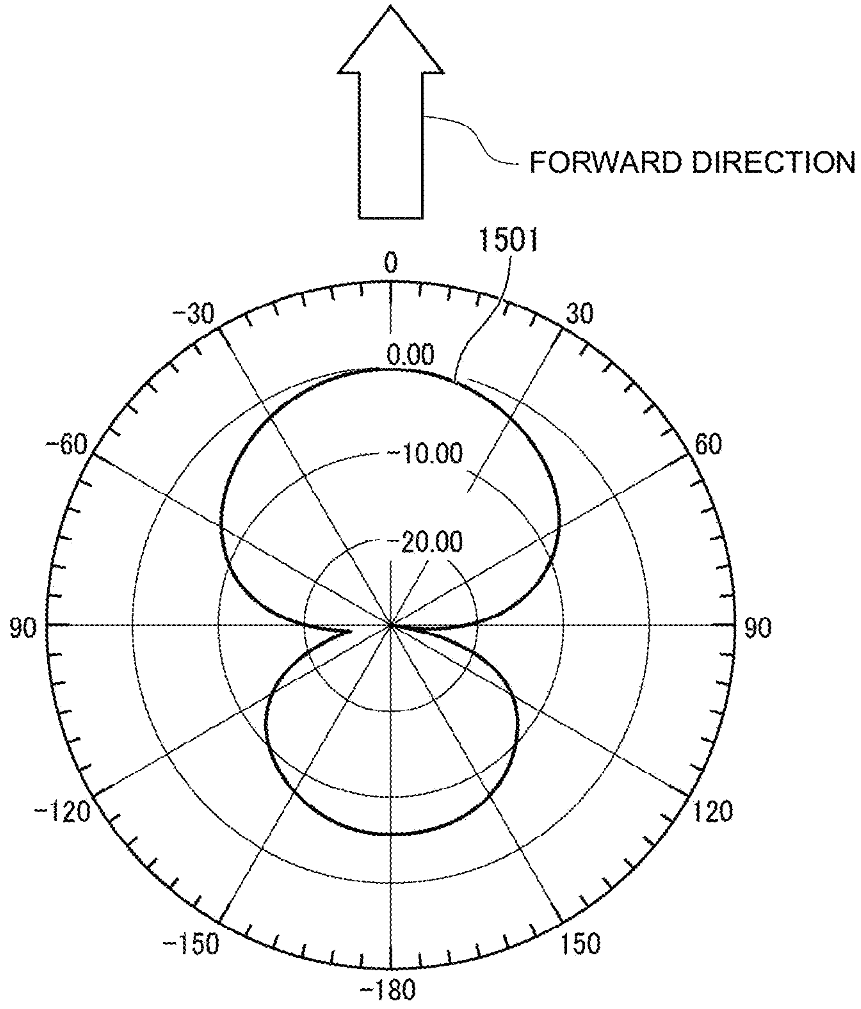
FIG. 15 is a diagram for describing a gain of the antenna device according to the second embodiment.

FIG. 15 is a diagram showing the gain of the antenna device according to the present embodiment. A range 1501 indicates the gain of the antenna device 300 according to the present embodiment. An upper side in the drawing is a forward direction. Referring to FIG. 15, in the antenna device 300, the gain on the rear side (that is, back surface side of the communication device 1) can be reduced as compared to the gain on the front side. That is, it is possible to exert the same effect as the gain of the antenna device 100 shown in FIG. 10 in the first embodiment. That is, even in the two second resonators (antenna conductors 315 and 317) connected to the GND layer 330 at the same position in the Y-axis direction, it is possible to reduce the resonance of the ground layer 330 arranged below the AMC layer 320.

As described above, according to the present embodiment, end portions of the two conductors (antenna conductors 315 and 317) on a side connected to the ground layer 130 are located on the same side in the longitudinal direction (for example, Y-axis direction).

Accordingly, when an antenna device having predetermined directivity in which the gain in the back surface direction is prevented is configured, it is possible to design the connection between each of the two antenna conductors and the ground layer to be on the same side in the longitudinal direction of the board.

Other Embodiments

Although various embodiments have been described above with reference to the drawings, it is needless to say that the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Components in the various embodiments described above may be combined optionally in the range without deviating from the spirit of the invention.

In the above embodiments, an example in which the antenna device 100 is mounted in the seat monitor installed in the aircraft has been described. However, the present invention is not limited to the seat monitor, and may be mounted on, for example, many Internet of things (IoT) devices such as a parent device or a child device of a cordless telephone, an electronic shelf label (for example, card-type electronic device which is attached to a display shelf of a retail store and displays a sales price of a product), a smart speaker, an in-vehicle device, a microwave oven, or a refrigerator.

In addition, the antenna device 100 according to the above embodiment has been described using an example of an antenna device capable of transmitting and receiving electromagnetic waves, but the present invention may be applied to, for example, an antenna device dedicated to transmission or dedicated to reception.

What is claimed is:

1. An antenna device comprising:
a board including a metamaterial layer, a ground layer, and a first layer disposed on a side opposite to the ground layer across the metamaterial layer;
a first resonator to which power is fed, the first resonator being provided in the first layer; and
a second resonator including two conductors provided along a longitudinal direction of the first resonator, the two conductors of the second resonator being provided on the first layer and on both sides of the first resonator in a short direction of the first resonator, wherein
the two conductors of the second resonator have end portions, and one terminal of each of the end portions is connected to the ground layer,
the first resonator includes two conductors, and
the power is fed to one of the two conductors of the first resonator, and another of the two conductors of the first resonator is connected to the ground layer.

2. The antenna device according to claim 1, wherein
the end portions of the two conductors of the second resonator on a side connected to the ground layer are located on opposite sides in the longitudinal direction.

3. The antenna device according to claim 1, wherein
the end portions of the two conductors of the second resonator on a side connected to the ground layer are located on a same side in the longitudinal direction.

4. The antenna device according to claim 1, wherein
a length of the second resonator in the longitudinal direction is a half wavelength of an output radio wave of the antenna device.

5. A communication device comprising:
an antenna device comprising:
a board including a metamaterial layer, a ground layer, and a first layer disposed on a side opposite to the ground layer across the metamaterial layer;
a first resonator to which power is fed, the first resonator being provided in the first layer; and
a second resonator including two conductors provided along a longitudinal direction of the first resonator, the two conductors of the second resonator being provided on the first layer and on both sides of the first resonator in a short direction of the first resonator, wherein
the two conductors of the second resonator have end portions, and one terminal of each of the end portions is connected to the ground layer, and
the first layer is located on a front surface side of the communication device, and
the ground layer is located on a back surface side of the communication device.

6. The antenna device according to claim 5, wherein
the end portions of the two conductors of the second resonator on a side connected to the ground layer are located on opposite sides in the longitudinal direction.

7. The antenna device according to claim 5, wherein
the end portions of the two conductors of the second resonator on a side connected to the ground layer are located on a same side in the longitudinal direction.

8. The antenna device according to claim 5, wherein
the first resonator includes two conductors, and
the power is fed to one of the two conductors of the first resonator, and another of the two conductors of the first resonator is connected to the ground layer.

9. The antenna device according to claim 5, wherein
a length of the second resonator in the longitudinal direction is a half wavelength of an output radio wave of the antenna device.

* * * * *